(12) United States Patent
Burd

(10) Patent No.: US 10,016,055 B2
(45) Date of Patent: Jul. 10, 2018

(54) COMPACT LIQUID COOLED, AIR THROUGH GALLEY CHILLER

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 9 days.

(21) Appl. No.: 14/754,593

(22) Filed: Jun. 29, 2015

(65) Prior Publication Data

US 2016/0007736 A1 Jan. 14, 2016

Related U.S. Application Data

(60) Provisional application No. 62/022,113, filed on Jul. 8, 2014.

(51) Int. Cl.
*A47B 31/02* (2006.01)
*A47B 31/06* (2006.01)
*B64D 11/04* (2006.01)
*F25D 17/08* (2006.01)
(Continued)

(52) U.S. Cl.
CPC .............. *A47B 31/02* (2013.01); *A47B 31/06* (2013.01); *B64D 11/04* (2013.01); *F25D 17/08* (2013.01); *F25D 21/14* (2013.01); *A47B 2031/023* (2013.01); *B64D 2013/0629* (2013.01); *B64D 2013/0674* (2013.01); *Y02T 50/46* (2013.01)

(58) Field of Classification Search
CPC ... A47B 31/02; A47B 31/06; A47B 2031/023; B64D 11/04; B64D 2013/0629; B64D 2013/0674; F25D 17/08; F25D 21/14; Y02T 50/46
See application file for complete search history.

(56) References Cited

U.S. PATENT DOCUMENTS

| 2,338,382 A | 1/1944 | Marlow |
| 2,432,587 A | 12/1947 | Ramsey |
| 3,982,584 A | 9/1976 | Spanoudis |

(Continued)

FOREIGN PATENT DOCUMENTS

| EP | 1243880 A1 * | 9/2002 | ............... F25B 5/02 |
| EP | 2251260 A2 | 11/2010 | |

(Continued)

OTHER PUBLICATIONS

International Search Report, dated Sep. 21, 2015, 4 pages, from PCT/US2015/039408.

(Continued)

*Primary Examiner* — Filip Zec
(74) *Attorney, Agent, or Firm* — Donna P. Suchy

(57) ABSTRACT

A chiller for an aircraft galley beverage cart compartment is disclosed wherein a liquid cooled chiller is located in the cart compartment vertically oriented against a back wall. The chiller engages the carts and circulates chilled air efficiently with a reduced footprint, allowing the depth of the cart compartment to be reduced. The unit includes a proportioning valve to control the amount of fluid through the heat exchanger and a distribution block on the post-cooling side to efficiently route the spent refrigerant.

10 Claims, 3 Drawing Sheets

(51) Int. Cl.
 *F25D 21/14* (2006.01)
 *B64D 13/06* (2006.01)

(56) References Cited

U.S. PATENT DOCUMENTS

| | | | |
|---|---|---|---|
| 4,323,110 A | 4/1982 | Rubbright et al. | |
| 4,361,014 A | 11/1982 | Blain | |
| 5,346,127 A | 9/1994 | Creighton | |
| 6,845,627 B1 | 1/2005 | Buck | |
| 6,880,351 B2 | 4/2005 | Simadiris et al. | |
| 6,941,764 B2 * | 9/2005 | Leroy | A47B 31/02 239/430 |
| 7,231,778 B2 | 6/2007 | Rigney et al. | |
| 7,380,408 B2 | 6/2008 | Zywiak et al. | |
| 8,117,864 B2 | 2/2012 | Montminy et al. | |
| 8,171,745 B2 | 5/2012 | Schroder | |
| 8,297,069 B2 * | 10/2012 | Novotny | H05K 7/20836 62/259.2 |
| 8,517,087 B2 | 8/2013 | Zeigler et al. | |
| 9,188,380 B2 | 11/2015 | Lu et al. | |
| 2007/0084226 A1 * | 4/2007 | Simadiris | B64D 11/04 62/184 |
| 2007/0137234 A1 * | 6/2007 | Zywiak | B64D 13/06 62/239 |
| 2008/0156031 A1 | 7/2008 | Cur et al. | |
| 2008/0193738 A1 | 8/2008 | Hensley et al. | |
| 2008/0196877 A1 * | 8/2008 | Zeigler | B60H 1/00907 165/202 |
| 2009/0107160 A1 | 4/2009 | Montminy et al. | |
| 2009/0301120 A1 | 12/2009 | Godecker et al. | |
| 2010/0224726 A1 | 9/2010 | Lu et al. | |
| 2011/0111196 A1 | 5/2011 | Hubbs | |
| 2013/0048264 A1 | 2/2013 | Lu et al. | |
| 2015/0313356 A1 * | 11/2015 | Burgess | A47B 31/02 62/79 |

FOREIGN PATENT DOCUMENTS

| | | | |
|---|---|---|---|
| FR | 2731780 A1 * | 9/1996 | F25B 40/02 |
| FR | 2851329 A1 | 8/2004 | |
| GB | 1385989 A | 3/1975 | |
| WO | 2009149320 A1 | 12/2009 | |

OTHER PUBLICATIONS

International Search Report, dated Nov. 21, 2014, 3 pages, from PCT/US2014/053010 published as WO2015/031539 on Mar. 5, 2015.
International Preliminary Report on Patentability dated Jan. 10, 2017 for PCT/US2015/039408.

* cited by examiner

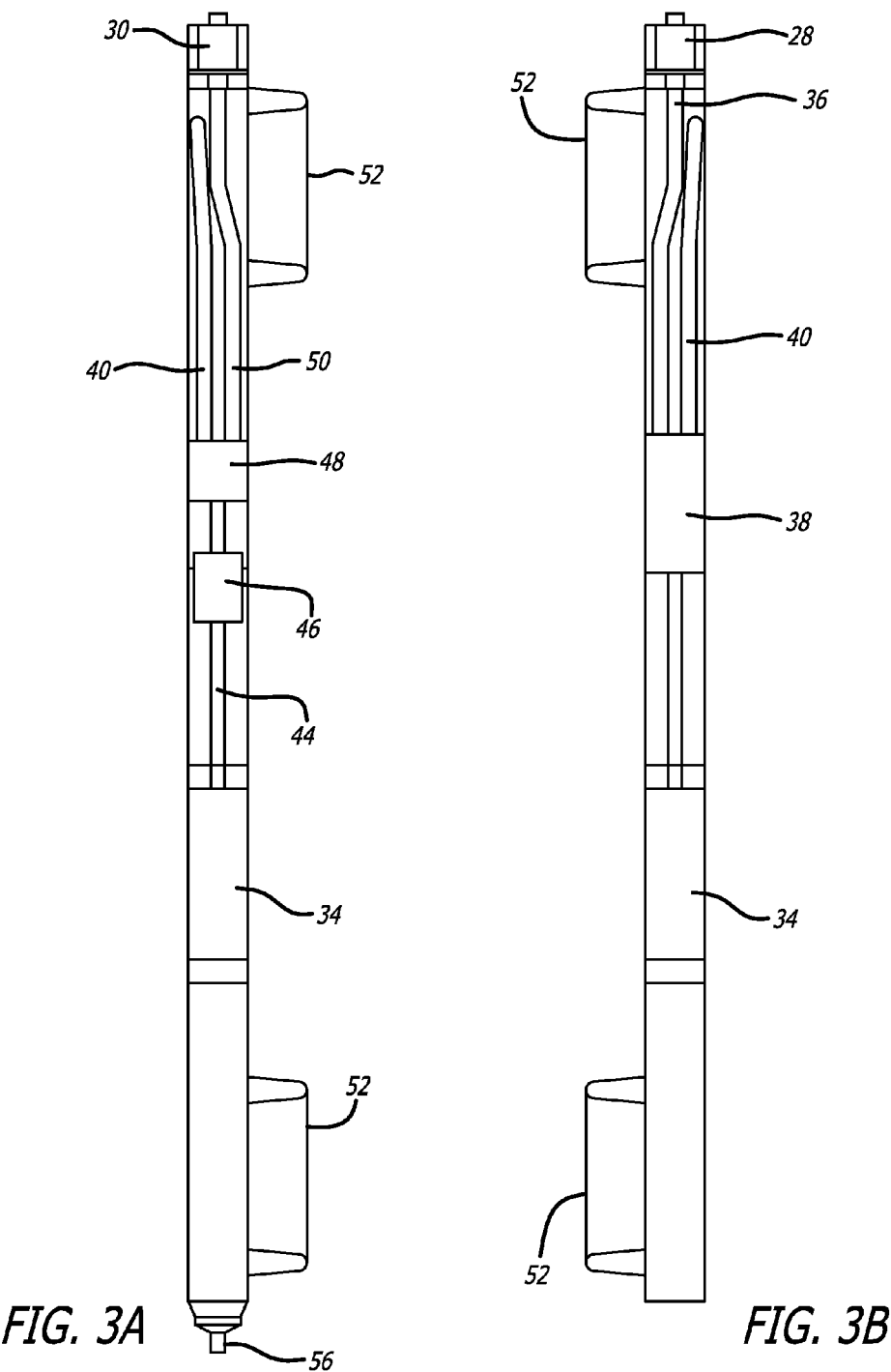

COMPACT LIQUID COOLED, AIR THROUGH GALLEY CHILLER

CROSS-REFERENCES TO RELATED APPLICATIONS

This application claims priority from U.S. Provisional Patent Application No. 62/022,113, filed Jul. 8, 2014, the content of which is fully incorporated by reference herein its entirety.

BACKGROUND

Large commercial passenger-carrying aircraft have galleys for preparing and serving food and beverages during the flight. These galleys are equipped with ovens, beverage makers, trash compactors, and various other kitchen type appliances used in the preparation and serving of the food and beverages. The galley also includes carts or trolleys that can be rolled down the aisles of the aircraft to serve meals and beverages to the passengers. As with all aircraft systems, these galleys and the equipment used therein must adhere to guidelines for weight and space, which are both premiums on an aircraft. As part of the food and beverage service, perishables are stored and then served on the flight. Perishables create a problem for aircraft operators because traditional refrigeration systems are too heavy and take up too much space to function in the aircraft galley. Thus, the aircraft manufactures must design a way to keep the perishables fresh during flight without refrigerators on the aircraft.

To this end, most commercial aircraft employ one of two types of systems for keeping perishable food stuffs and non-perishable drinks at desired temperatures from loading to service on the flight. The first method utilizes vapor cycle based air chillers that utilize conventional refrigerant gas compression and expansion technology to generate a secondary recirculated chilled air loop. The chilled air is generally supplied and returned via a thermally insulated air ducting to and from a suitable storage structure, such as the galley. The air chiller may be located on or in the galley or mounted in part of the aircraft airframe.

The second method utilizes the same conventional refrigerant gas compression and expansion technology, but the cooling medium is a chilled liquid rather than a gas. This chilled liquid is pumped in a closed loop to and from a suitable storage structure, such as a galley. The chilled liquid in some cases are configured as a large centralized system for the whole aircraft. In other cases, the chilled liquid can be circulated at each separate aircraft galley structure to establish a local area chilling loop, or be based on each individual galley as a standalone system. At the galley, the liquid is passed via a control valve and an electronic control system to a heat exchanger, where an electric axial (or other) fan blows or sucks air through its matrix around enclosed areas of the storage structure that requires chilling, for example: a galley cart bay or compartment. The heat exchanger fan and its control system (though not necessarily all) are grouped together to form a chilled air recirculation unit that may be fitted in the galley or remotely spaced from it.

One drawback of these various chiller systems is that they still take up a large percentage of available space in the galley, which is at a premium in an aircraft for obvious reasons. Further, the chillers tend to be very heavy, which is also a drawback to their use on aircraft. There are also issues with condensation collection and removal, and the need for improvements in heat transfer efficiency. Further, air control flaps are necessary to reduce the loss of chilled air, which makes the system more inefficient. Accordingly, it would be beneficial to have a chiller system that takes up less space and reflects a reduction in weight over conventional chiller systems currently in use, while providing for condensation collection and improved heat transfer efficiency.

SUMMARY OF THE INVENTION

The present invention is a chilled air distribution system for an aircraft, with a reduced overall foot print and reduced weight, and with an improved overall heat transfer efficiency. The compact lightweight system is particularly well suited for an aircraft galley that requires refrigerated or cooled carts or trolleys, and/or carts carrying standard meal boxes, and/or chilled food and beverage compartments. The chiller system of the present invention comprises a vertically oriented cooling unit adjacent the beverage carts and below the work deck of the aircraft galley, which includes ducting leading away from the beverage cart storage to carry away heated air during the cooling process. An interlock connects the system in the presence of the beverage/meal cart, and when the beverage/meal cart is removed, the interlock cooperates to turn off the fans that distribute the chilled air, and diverts the chilled refrigerant through a bypass loop (eliminating the need for fitting of an air outlet and inlet with self-closing flap valves).

The air cooled module is vertically oriented and positioned in the compartment where the beverage/food carts are housed in the galley below the work deck. In a preferred embodiment, the module is mounted to the back wall of the compartment and adds a depth of no more than 1.65 inches (42 mm). Conduits distribute chilled coolant between the heat exchanger of the module and a chilled liquid distribution manifold that is located the top of the compartment, and fed from aircraft piping in the galley central column or from another available location. The connections for the liquid coolant fittings can be either threaded or quick-disconnect in a preferred embodiment. The module is preferably connected to the distribution manifold by means of a plurality of flexible hoses that permit quick and easy installation and removal.

The cooling module may take the form of a galley LRU (Line Replaceable Unit), and incorporates air to liquid heat exchangers for chilling the recirculated air passing through the associated beverage cart. In another preferred embodiment, the cooling module may include defrosting heaters for clearing ice from the heat exchanger and other components when necessary. In such cases, it is preferable to include automatic drain valves to allow condensation to be removed from the bottom of the module's housing and directed to the aircraft's waste water system.

A feature of the present invention is the incorporation of an electric three way divert or proportioning valve that controls the flow of refrigerant liquid through the heat exchanger, taking into consideration the temperature requirements of each individual chilled cart compartment. One or more axial fans are provided to recirculate the chilled air around the inside of the installed cart, although other types of fans are also available. The control of the module is effected by a local control box, including relays that communicate signals to and from a common galley mounted controller (e-box). Easily detachable power and data cables are routed to and from the unit and feed information about the system to the main galley controller. Anti-vibrational measures can be incorporated as well to prevent vibrations from being transmitted to the galley structure, such as elastic mounts that dampen vibration from various sources.

The location of the invention plays a useful role in both the galley foot print and weight reduction, as well as the efficient distribution of chilled air around the below work deck installed trolley or cart. The through work deck air path, ductwork and air guiding devices are positioned for the efficient use of the chilled air to meet the certification requirements of the aircraft manufacturers.

Other features and advantages of the present invention will become more apparent from the following detailed description of the preferred embodiments in conjunction with the accompanying drawings, which illustrate by way of example the operation of the invention

BRIEF DESCRIPTION OF THE DRAWINGS

FIG. 3A is a side view of the embodiment of FIG. 1 with the left hand side sectioned for clarity; and FIG. 3B is a side view of the embodiment of FIG. 1 with the right hand side sectioned for clarity.

DETAILED DESCRIPTION OF THE PREFERRED EMBODIMENTS

Figure 1:
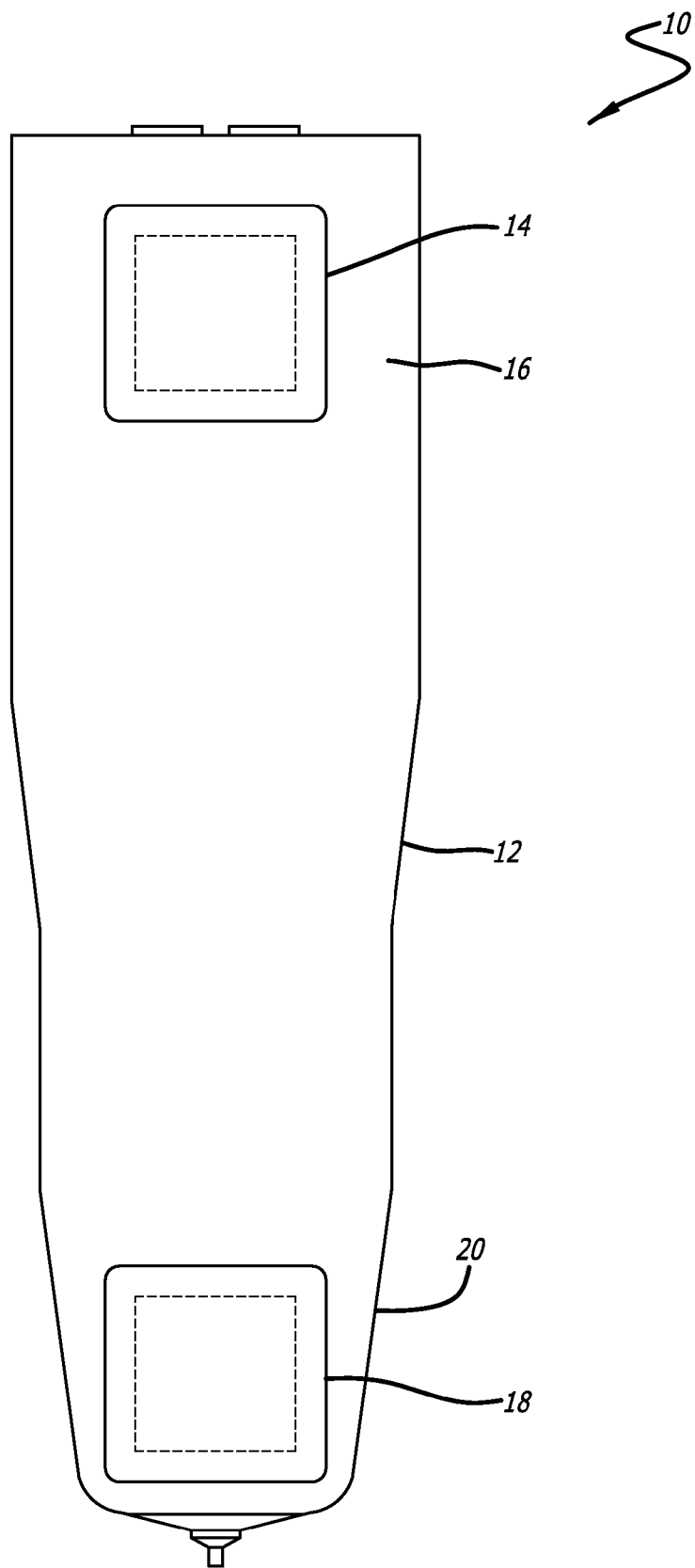
FIG. 1 a front view of a first preferred embodiment of the present invention.

FIG. 1 illustrates a front view of a first embodiment of the present invention showing a compact liquid cooled, air through chiller 10 for use in an aircraft galley. The components of the chiller are encased in a housing 12 made of a light-weight, sturdy polymer or aluminum case, with an air supply port 14 located at the upper portion 16 and an air return port 18 at the bottom portion 20. In a preferred embodiment, the ports 14,18 are covered by a close mesh (not shown) to prevent dust, insects, and vermin from gaining access to the chiller's components or gaining access to the food stored in the adjacent cart.

Figure 2:
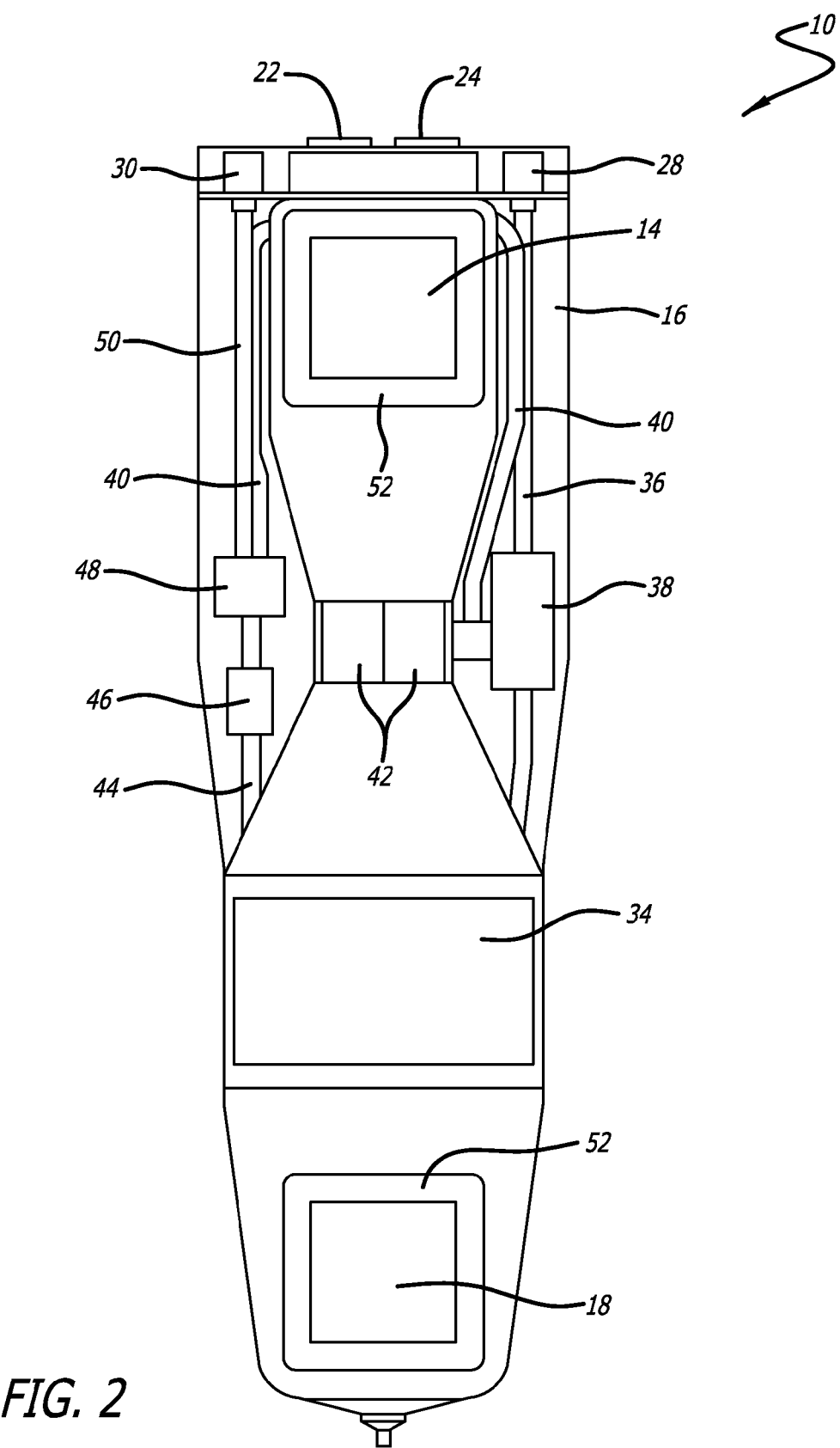
FIG. 2 is a front view of the embodiment of FIG. 1 with the cases removed.

With the case removed as illustrated in FIG. 2, the components and their relationship with each other become readily apparent. The upper portion 16 of the module includes a pair of ports, a first port 22 for connecting power to the unit and a second port 24 for communications/data exchange. The power port 22 can be connected to the main galley power distribution network, which is typically a three phase voltage system that complies with FAA regulations. Also at the upper surface of the chiller 10 is a liquid inlet 28 and a liquid outlet 30 for circulating the liquid refrigerant through the chiller 10. The refrigerant can be cycled through the system to a heat exchanger 34. The inlet 28 for the refrigerant is connected via a supply conduit 36 to a three-way proportioning valve 38 for controlling the flow of the refrigerant through the system. A portion of the refrigerant flows through the heat exchanger 34, and a portion of the refrigerant is routed back through a bypass line 40. The amount of refrigerant that is directed to the heat exchanger and the amount of fluid that is directed to the bypass line is managed by a controller that monitors the heating requirements of the galley cart and then adjusts the cooling output of the chiller accordingly.

Air is drawn in through the return port 18 using one or more tube axial fans 42, carrying the air over the heat exchanger 34 and chilling the air as the liquid refrigerant cools the heat exchanger coils. The heat exchanger 34 in the exemplary embodiment is a twelve row heat exchanger that circulates the liquid refrigerant as warm returning air is directed over the coils, thereby chilling the air. The liquid refrigerant is carried away from the heat exchanger 34 through a liquid return valve 46 and supply line 44, which includes a three way flow distribution block 48 to recirculate the cooling fluid. The flow distribution block 48 includes a path 50 to the liquid refrigerant outlet 30 of the chiller 10 on the top of the unit, where the fluid is then routed to the main pumping and heat exchanger system. A second inlet to the distribution block 48 includes the conduit from the bypass line 40. The fans 42 adjacent the heat exchanger 34 draw the warmer air across the heat exchanger 34 through the air inlet 18 and then blow the cooled air back through the air supply port 14 and directly into the beverage/food cart via an interlock. The interlock is actuated/controlled by the presence of the beverage cart, and turns off the axial fan 42 automatically when the cart is not present. Furthermore, the chilled refrigerant is directed in a recirculation mode through the bypass line 40 when the cart is not present, eliminating the need for self-closing air flaps or other closures. In a preferred embodiment, however, a seal 52 is placed around the air inlet 14 and air outlet ports 18 to reduce or eliminate leakage and losses at the juncture of the cart and the chiller.

FIGS. 3A, 3B show the side view of the left and right portions of the chiller 10. A condensation drain fitting 56 is disposed on the left hand side of the unit for collecting and directing condensation to a waste water disposal port as part of the aircraft's gray water system. The liquid refrigerant inlet 28 and outlet 30 at the top of the right side and left side, respectively, have associated conduits 36, 50 that lead to the proportioning valve 38 and the distribution block 48.

A feature of the present invention is the high capacity of the chiller unit 10 in a compact footprint. As shown in FIG. 3, the chiller 10 occupies less space than traditional galley chiller units, while fulfilling all of the requirements for the preservation of perishables and the like on long distance flights. Specifically, the invention significantly reduces the space required for the effective chilling (refrigeration) of currently manufactured ATLAS or ACE standard "Air Through" beverage/food carts, on aircraft using remotely supplied chilled liquid as a cooling medium. The chiller of the present invention allows the depth of a conventional aircraft catering galley to be reduced by 3 to 4" (75 to 100 mm) while maintaining full effectiveness.

Advantages of the present invention include a reduction of the depth of an air-through chiller module to 1.65" (42 mm), allowing the reduction in the overall depth of a galley when compared with a galley employing conventional air through beverage/food carts. The compact and efficient nature of the chiller provides for independent and individual chilling of each cart bay according to the thermal demand. Moreover, the location of the chilled liquid distribution manifolds at the top of the chilled cart bays towards the rear of the galley work deck provides an easy and convenient system for integrating with the main liquid coolant system of the galley. Efficiency is promoted through the distribution of the air inside the chilled cart by means of flow efficient ductwork, where warmer air is chilled and recirculated through the compartment. The invention provides significant reductions in weight through the use of plastics and light weight composite materials, and energy efficiency through the use of a combination of liquid flow proportioning via a proportioning valve, and adjustable fan speed to control the chilling capability (btu output) of each individual module. The use of an automatic condensate drain down device removes excess condensed water from the case of the air cooling module for safety and health concern, and the elimination of the requirement for air control flaps through the use of a cart actuated interlock device saves costs while aiding in prevention of heat losses.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. An air through liquid refrigerant aircraft galley chiller for disposition in a galley cart compartment, comprising:
   a liquid refrigerant inlet and a liquid refrigerant outlet for connection to an external pumping system;
   a heat exchanger;
   a supply air port and a return air port for delivering air to and receiving air from an adjacent galley cart, respectively;
   a three way proportioning valve connected to the liquid refrigerant inlet for controlling the flow of refrigerant through the heat exchanger, wherein a controller controls the three way proportioning valve based in part on detecting presence of the adjacent galley cart;
   a flow distribution block for receiving liquid refrigerant from the heat exchanger and from the three way proportioning valve, and communicating the liquid refrigerant to the liquid refrigerant outlet; and
   a bypass line disposed between the three-way proportioning valve and the flow distribution block;
   wherein, in a first operational mode, the bypass line receives all liquid refrigerant flowing into the proportioning valve for recirculation to the liquid refrigerant outlet via the flow distribution block,
   wherein in a second operational mode, the bypass line receives a first portion of the liquid refrigerant flowing into the proportioning valve and the heat exchanger receives a second portion of the liquid refrigerant, and
   wherein the controller causes the chiller to switch from the second operational mode to the first operational mode upon failing to detect presence of the adjacent galley cart.

2. The air through liquid refrigerant aircraft galley chiller of claim 1, wherein a depth of the chiller when mounted in the galley cart compartment in a vertical orientation is less than two inches.

3. The air through liquid refrigerant aircraft galley chiller of claim 1, further comprising an automatic drain valve at a bottom of the chiller for expelling condensate to a waste water system on the aircraft.

4. The air through liquid refrigerant aircraft galley chiller of claim 1, wherein the liquid refrigerant inlet and outlet comprise quick disconnect couplings.

5. The air through liquid refrigerant aircraft galley chiller of claim 1, wherein the controller is further configured to adjust fan speed based on conditions within the galley cart compartment.

6. The air through liquid refrigerant aircraft galley chiller of claim 1, further comprising an interlock configured to turn off an axial fan when the adjacent galley cart is not engaging the supply air port and the return air port.

7. The air through liquid refrigerant aircraft galley chiller of claim 1, further comprising a liquid return valve configured to carry liquid refrigerant from the heat exchanger through a supply line to the flow distribution block, wherein:
   in the first mode, the liquid return valve blocks the flow of liquid refrigerant from the bypass line through the flow distribution block and into the heat exchanger; and
   in the second mode, the liquid return valve allows for passage of liquid refrigerant from the heat exchanger to the flow distribution block.

8. The air through liquid refrigerant aircraft galley chiller of claim 1, wherein the chiller is a line replaceable unit.

9. The air through liquid refrigerant aircraft galley chiller of claim 1, wherein the chiller is configured for mounting on a rear wall of the galley cart compartment, wherein the supply air port is vertically aligned with the return air port.

10. The air through liquid refrigerant aircraft galley chiller of claim 9, wherein the heat exchanger is vertically aligned with the supply air port and the return air port within a shared housing.

* * * * *